XR 3,029,419

SEARCH ROOM

CROSS REFERENCE

April 10, 1962 H. H. CLINTON 3,029,419

WAVE SIGNAL RECEIVER MONITOR

Filed Sept. 6, 1957 2 Sheets-Sheet 1

INVENTOR.
Henry H. Clinton
BY Diggins & LeBlanc
ATTORNEYS

3029419
OR IN 340/203

April 10, 1962 H. H. CLINTON 3,029,419

WAVE SIGNAL RECEIVER MONITOR

Filed Sept. 6, 1957 2 Sheets-Sheet 2

INVENTOR.
Henry H. Clinton
BY Diggins & LeBlanc
ATTORNEYS

United States Patent Office 3,029,419

Patented Apr. 10, 1962

3,029,419
WAVE SIGNAL RECEIVER MONITOR

Henry H. Clinton, Vernon, Conn., assignor to C-E-I-R, Inc., a corporation of Delaware Filed Sept. 6, 1957, Ser. No. 682,382
6 Claims. (Cl. 340—203)

Figure 1:
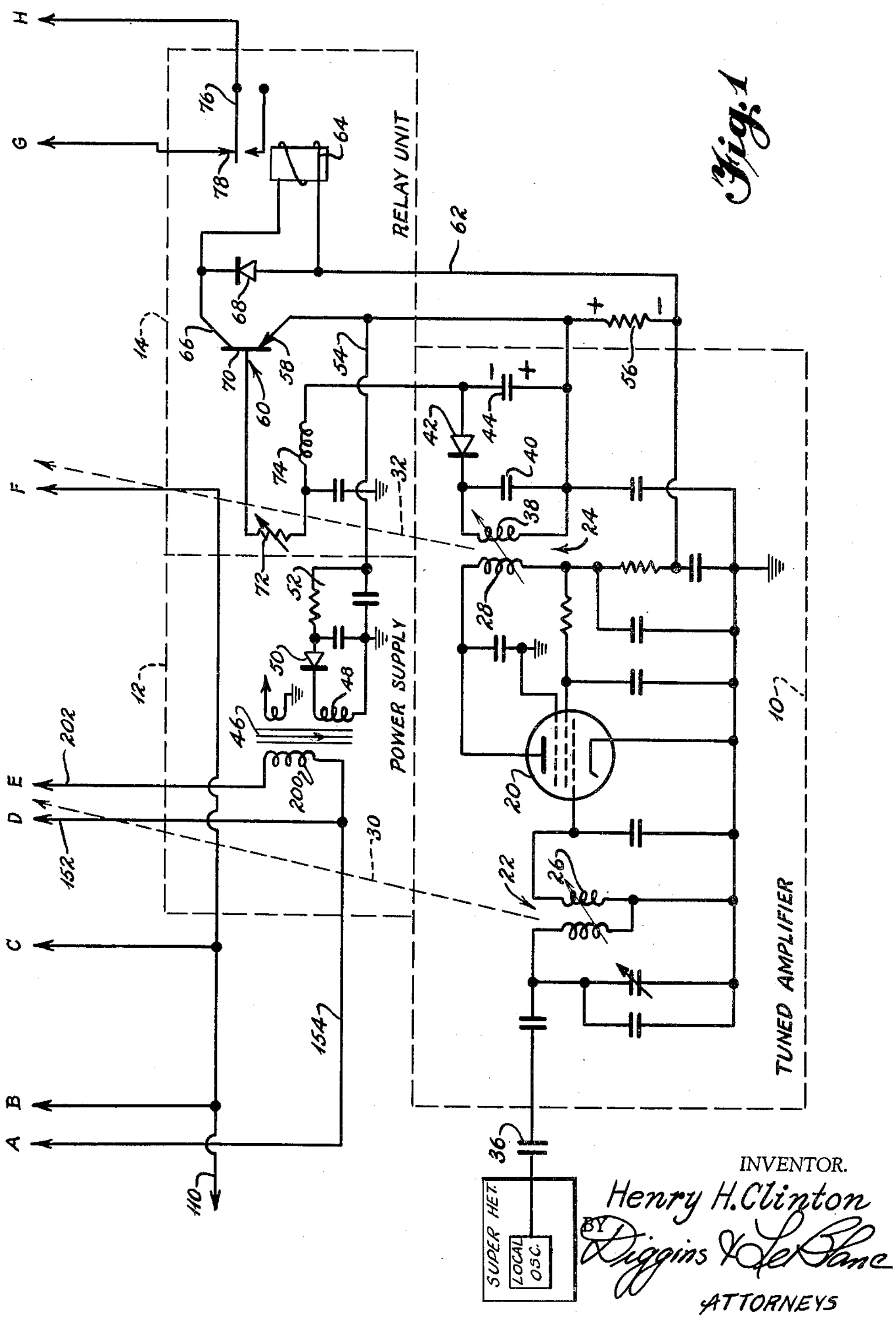

This invention relates to improvements in intelligence transmission systems and more particularly to systems in which intelligence is transmitted in the form of pulses and is received and converted into visual intelligence. In its most specific aspect, the invention relates to a system and apparatus for indicating at a remote point the tuning condition of wave signal receivers.

In recent years it has become increasingly important for radio and television advertisers to be able to determine the listening habits of wave signal receiver users so as to analyze the effectiveness of radio and television advertising. While numerous schemes have been employed for this purpose, it is now generally agreed that instrumented methods of determining the viewing habits of users is the only satisfactory way of obtaining accurate information. In many cases it is desirable that the information with respect to the tuning condition of a plurality of wave signal receivers be instantaneously available at a central station or at a central point remote from the place or places where the receivers are located. This permits the analysis organization which controls such central station or central point and which prepares an analysis of the listening or viewing habits of wave signal receiver users to have the information to prepare reports with a minimum of delay.

Various types of instrumented systems for securing this information have been proposed and these systems have utilized varying amounts of equipment of varying degrees of complexity. For the most part, the methods of which I am aware have been subject to one or more disadvantages which, to date, have prevented their actual commercial use.

According to the method used in one system, the tuner of the wave signal receiving apparatus is utilized to rotate a switch or some mechanical drive which controls the generation of a signal to be transmitted to the central station. Because of the varying types of tuners used in wave signal receivers, however, this presents a practical economic problem in that it is often extremely difficult to provide a take-off from the tuner shaft. In many instances the accessible portion of the tuner shaft consists of a stub no more than approximately one-eighth inch in length, so that it is impractical to utilize many of the numerous types of switching arrangements which have been proposed in the past.

In my copending application Serial No. 682,383 filed on an even date herewith, there is disclosed an arrangement which has been found advantageous and satisfactory as a means of providing a take-off from a tuner shaft. In some instances, however, it is desirable or necessary to be able to dispense with such a take-off. That is to say, in certain cases, the tuner shaft end is covered by a shield or other component of the wave signal receiver, so that it is inaccessible except by a major change in the arrangement of the wave signal receiver itself.

It is well known that substantially all modern radio receivers, including the audio sections of television receivers, in extensive use today are of the so-called superheterodyne type. That is to say, the frequency of the incoming signal is changed to a new frequency, namely, the intermediate frequency, which intermediate frequency is obtained by the heterodyne process. In other words, the frequency is changed by combining the radio frequency of the incoming signal with the output of an adjustable local oscillator generally referred to as the high frequency oscillator or simply the local oscillator.

It will be understood by those skilled in the art that the local oscillator of a superheterodyne receiver produces a signal which varies in frequency in dependence upon the particular transmitted signal to which the receiver employing such local oscillator happens to be tuned. It will be apparent therefore that the frequency of the oscillator provides an indication of the tuning condition of the receiver.

The present invention is directed to a system for providing remote indication of the tuning condition of wave signal receivers without using a mechanical or electrical take-off from the tuner shaft, by using the local oscillator signal of the wave signal receiver to control the generation of a signal containing the desired intelligence. According to the invention a shaft is driven by a motor under control of the frequency of the local oscillator signal and this shaft is used to produce a series of pulses which by their number convey information as to the tuning condition of the wave signal receiver.

It is accordingly a primary object of the present invention to provide a new and improved apparatus for producing an indication or record of the listening habit of wave signal receiver users.

It is another object of the invention to provide an apparatus for producing an indication or record of the listening habits of wave signal receiver users which is adapted to be easily attached to practically all types of radio and television receivers without major modification of the tuning arrangement in such receivers.

It is another object of the present invention to provide an apparatus for producing an indication or record of the listening habits of wave signal receiver users which does not have to be mechanically connected to the tuner of the wave signal receiver.

It is another object of the invention to provide an apparatus for producing an indication or record of the listening habits of wave signal receiver users which produces a series of pulses, the number of which provide the desired information as to the transmitting station to which the particular wave signal receiver is tuned.

Figure 2:
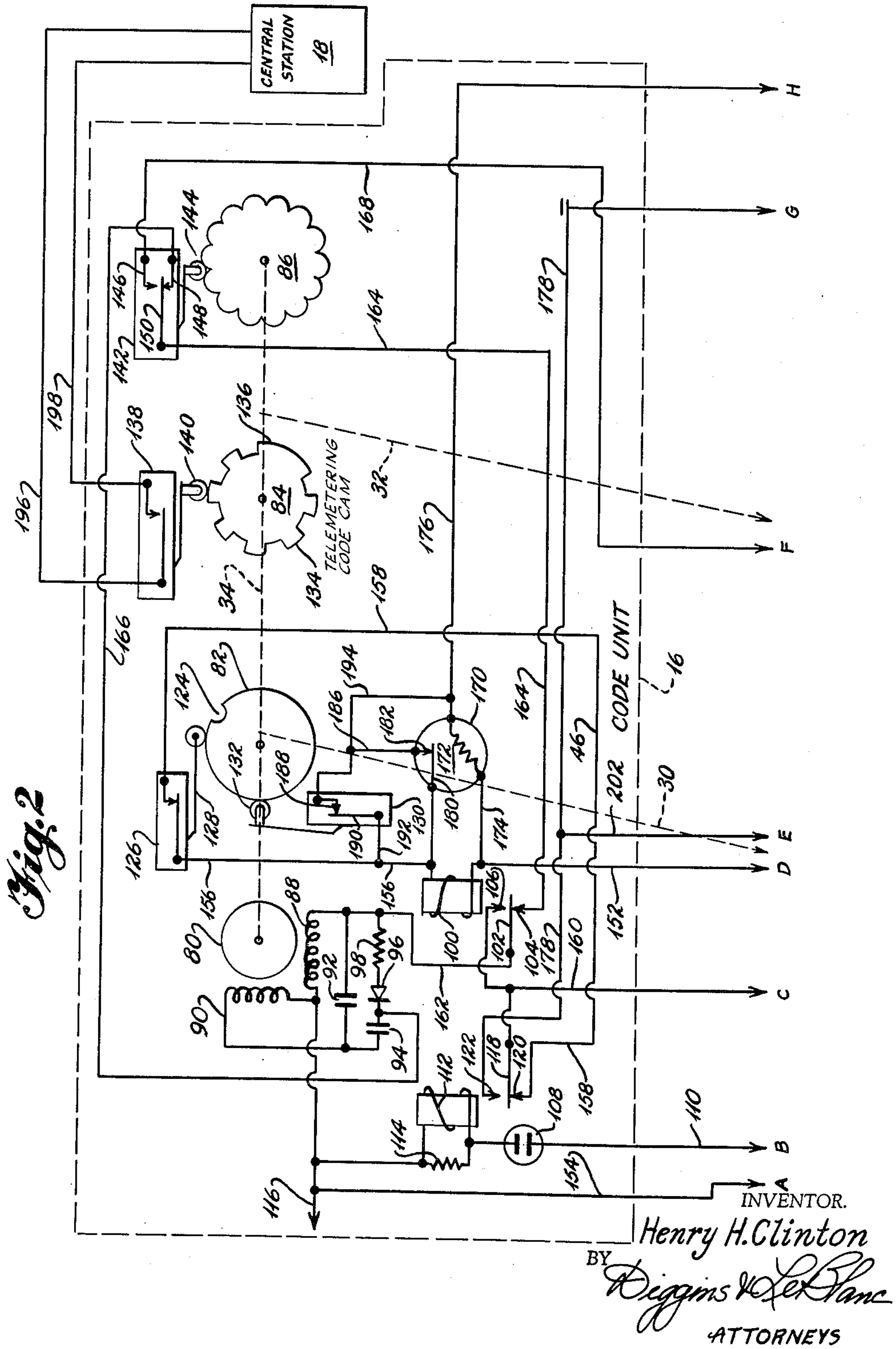

These and further objects and advantages of the invention will become more apparent upon reference to the following specification and claims and attached drawings wherein:

FIGURE 1 is a circuit diagram of the shaft control circuit of the invention; and FIGURE 2 is a circuit diagram of the code unit of the invention.

Referring to the figures of the drawing, the apparatus of this invention consists of a tuned radio frequency amplifier 10, a power supply 12, a relay unit 14, a code unit 16 and a reproducing or recording unit at the central station 18. The tuned amplifier 10 comprises a pentode 20 having a tuned control grid circuit 22 and a tuned plate circuit 24. The tuned control grid circuit 22 contains a variable impedance transformer 26 and the tuned plate circuit 24 contains a variable impedance transformer 28. The impedances of both transformers are varied by means of shafts 30 and 32 connected to a code shaft 34, presently to be described in further detail. While the transformers in these tuned circuits are shown as being of variable impedance, it will be apparent to those skilled in the art that it would be equally feasible to vary the capacitance of the associated condensers. The input circuit of pentode 20 is connected through a coupling condenser 36 to the local oscillator of the wave signal receiver.

The secondary 38 of the plate transformer 24 is shunted by a capacitor 40 and a series connected diode 42 and capacitor 44. When an A.C. signal is developed across the secondary 38 of the transformer 24, a D.C. voltage is developed across the capacitor 44 with the polarity shown in the drawing. Since the amplifier 10 is a tuned amplifier, a voltage appears across the capacitor 44 only when the local oscillator of the wave signal receiver is producing a signal having the same frequency to which the amplifier 10 is tuned.

The power supply for the tuned amplifier 10 is provided by the power supply 12. This power supply consists of a power transformer 46 having a high voltage secondary 48 which feeds a rectifier 50 and filter circuit 52. The positive voltage developed on the lead 54 is connected to the plate and screen circuit of the pentode 20 through a resistor 56. This same lead 54 is also connected to the emitter 58 of a PNP transistor 60. The other side of resistor 56 is connected through lead 62 and relay 64 to the transistor collector 66. A protective diode 68 is shunted about the relay 64 to protect the transistor from the inductive effect of the relay coil. The base 70 of the transistor 60 is connected through a sensitivity control resistor 72 and RF choke 74 to the upper terminal of capacitor 44. It will thus be seen that the transistor is connected in a common emitter circuit and that the collector supply voltage is developed across the resistor 56.

When the local oscillator is generating a signal at a frequency other than that to which the amplifier is tuned, no voltage appears across the capacitor 44, the transistor remains non-conducting and the relay 64 is deenergized. When a voltage is developed across the capacitor 44, a negative voltage appears on the base of the transistor, the transistor conducts, and relay 64 is energized. The sensitivity control resistor 72 permits adjustment of the point at which the transistor commences to conduct. Since a voltage is developed across capacitor 44 only when the tuned amplifier 10 is tuned to the same frequency as the signal from the local oscillator, it will be apparent that the relay 64 is energized when the tuned amplifier is tuned to the same frequency as the local oscillator. The relay 64 controls a movable contact arm 76 which engages stationary contact 78 when the relay 64 is deenergized. When the relay is energized, this connection is broken.

Turning now to the code unit 16, a capacitor motor 80 drives the code shaft 34 on which an "off" cam 82, code cam 84 and index cam 86 are mounted. The capacitor motor 80 has a main winding 88 and an auxiliary winding 90. One terminal of the auxiliary winding is connected to one terminal of the main winding and the other terminal of the auxiliary winding is connected through a capacitor 92 to the other terminal of the main winding. Capacitor 92 is shunted by a series connected capacitor 94, diode 96, and resistor 98 for a purpose presently to become apparent. The motor is controlled by means of a motor control relay 100 having a movable arm 102 which engages a stationary contact 104 when the relay is deenergized and which engages a stationary contact 106 when the relay is energized.

The apparatus is provided with a power receptacle 108 into which the conventional power supply cord of the wave signal receiver is plugged. This receptacle has one terminal thereof connected to a power supply lead 110 which goes to the regular commercial power supply line. The other terminal of the receptacle 108 is connected to a relay 112 which is shunted by a resistor 114, and the other side of this relay is connected to the other power lead 116. The relay 112 controls a movable arm 118 which engages a stationary contact 120 when the relay is deenergized and which engages a stationary contact 122 when the relay is energized.

The "off" cam 82 is provided with a detent 124 and cooperates with an "off" switch 126 having an actuating arm 128 bearing against the surface of the "off" cam. When the end of the arm 128 engages the detent 124, the switch 126 is opened. At all other times the "off" switch is closed. The "off" cam 82 also has associated therewith a "trouble" switch 130 having an arm 132 engaging the surface of the cam. This switch also opens when its arm engages the detent 124 and is closed at all other times.

The code cam 84 is provided with a plurality of tabs 134 and with a longer reset tab 136. This cam is associated with a pulse switch 138 having an arm 140 engaging the surface of the code cam. The pulse switch 138 is closed when the end of arm 140 engages a tab 134 and is opened when the end of arm 140 is in the depression between tabs. The index cam 86 is provided with a fluted edge and cooperates with an index switch 142 having an arm 144 engaging the surface of the cam. The switch 142 is provided with a pair of stationary contacts 146 and 148 and a movable arm 150. When the switch arm 144 is at the top of the fluted portions of the index cam, the movable arm 150 contacts stationary contact 146. When the end of switch arm 144 is in the depression between the fluted portions of the cam edge, the movable arm 150 engages stationary contact 148.

The lower terminal of the motor control relay 100 is connected through leads 152 and 154 to the upper power supply line 116. The upper terminal of the motor control relay 100 is connected through lead 156 to the "off" switch 126. The other side of "off" switch 126 is connected through lead 158 to the lower stationary contact 120 associated with relay 112. The movable arm 118 on this same relay is connected through lead 160 to the lower power supply line 110. It will thus be seen that the circuit just traced will provide power to the motor control relay 100 so long as "off" switch 126 is closed and relay 112 is deenergized, as is the case when the wave signal receiver is turned off.

The movable arm 102 associated with the motor control relay 100 is connected by lead 162 to the right terminal of the main winding 88 of the capacitor motor 80. The upper stationary contact 106 of the motor control relay 100 is connected through line 160 to the lower power supply line 110. The left terminal of the main winding 88 of capacitor motor 80 is connected to the upper power supply line 116, so that when the motor control relay 100 is energized, power is supplied to the motor 80 to cause it to run. The circuit for this power extends through the motor control relay contacts 102 and 106.

The lower stationary contact 104 associated with the motor control relay 100 is connected through lead 164 to the movable arm 150 of the index switch 142. The lower stationary contact 148 of this switch is connected by lead 166 to the junction between the capacitor 94 and diode 96 in the motor circuit. The upper stationary contact 146 of the index switch 142 is connected by lead 168 to the lower power line 110.

The power transformer 46 of power supply 12 has its primary 200 connected at one terminal thereof through lead 154 to the upper power supply line 116. The other terminal of the primary 200 is connected through lead 202 and lead 178 to the upper stationary terminal 122 of relay 112, so that this transformer is energized when the wave signal receiver is turned on to energize relay 112.

A time delay tube 170 has a heating element 172 therein and one terminal thereof is connected by lead 174 to the lower terminal of the motor control relay 100. The other terminal of the heating element is connected by lead 176 to the movable arm 76 of the relay 64 in the relay unit 14. The stationary contact 78 of this relay 64 is connected by lead 178 to the upper stationary terminal 122 of relay 112 at the power receptacle 108. The time delay tube 170 also contains a movable switch arm 180 and a stationary switch contact 182. The movable contact arm 180 is connected by conductor 184 to the upper terminal of motor control relay 100, while the stationary contact 182 is connected by conductor 186 to the stationary contact 188 of "trouble" switch 130. The movable arm 190 of the "trouble"

switch 130 is connected by conductors 192 and 156 to the upper terminal of the motor control relay 100. The stationary contact 182 in the time delay tube 170 is also connected by conductors 186 and 194 to one end of the heating element 172.

The pulse switch 138 has its contacts connected to a pair of leads 196 and 198 which carry the pulse signal to the central station 18. The pulse signal there may actuate a stepper switch arrangement of the type shown in my aforementioned copending application for the purpose of indicating or recording the tuning condition of the wave signal receiver.

The operation of this device is as follows:

Assume that the tuned amplifier is not tuned to the same local oscillator frequency as is the local oscillator of the wave signal receiver to which the apparatus is attached. Under such circumstances, the tuned amplifier produces no output voltage across capacitor 44 and transistor 60 does not conduct. The relay 64 is therefore deenergized and its contacts are in the position shown.

When the wave signal receiver is turned on, current flows to receptacle 108 and relay 112 is energized. This causes movable arm 118 of relay 112 to engage stationary contact 122 and supply power to the primary 200 of transformer 46 in power supply 12. The supply circuit to this transformer primary is as follows: power line 116, line 154, primary 200, line 202, line 178, contact 122, movable contact 118, line 160, and power line 110. Energization of this transformer provides plate and filament voltage for the tuned amplifier 10 and also provides a collector supply voltage across resistor 56 for the transistor 60.

With relay 112 energized and relay 64 in the relay unit 14 deenergized, the motor control relay 100 is energized through the following circuit: supply line 116, conductor 154, conductor 152, motor control relay 100, conductor 156, "trouble" switch 130, conductor 194, conductor 176, movable arm 76 of relay 64, stationary contact 78, conductor 178, stationary contact 122 of relay 112, movable arm 118, conductor 160 and power supply line 110. "Trouble" switch 130 is also shunted by means of the contacts 180 and 182 in the time delay tube 170. These contacts remain closed until the heating unit 172 reaches a certain pre-determined temperature at which time these contacts open. The time delay tube is utilized in this apparatus as a safety device to stop the motor from running after it has driven the code shaft 34 through a pre-determined number of revolutions. It will be seen that the heating element 172 is energized whenever the wave signal receiver is turned on to energize relay 112 and the relay unit relay 64 is deenergized. This condition corresponds to the motor running to scan for the local oscillator signal. When the signal is found relay 64 is energized, motor control relay 100 is deenergized and the motor stops. When relay 64 opens the heating element 172 is disconnected.

Thus far it has been seen that when the television set is turned on, a power supply is provided to the tuned amplifier and the motor control relay is energized to cause the motor 80 to run. The circuit to the motor is completed as follows: power line 116, main winding 88, lead 162, movable arm 102 of motor control relay 100, stationary contact 106, lead 160 and power conductor 110. As the motor 80 rotates, the code shaft 34 and shafts 30 and 32 change the frequency to which the tuned amplifier 10 is tuned. When the frequency of the tuned circuits in the tuned amplifier reach the frequency of the signal being generated by the wave signal receiver local oscillator, relay 64 in the relay unit is energized to break the contact between stationary contact 78 and movable arm 76. This opens the circuit to motor control relay 100 which in turn breaks the power supply to the motor winding.

It will be seen, however, that the motor is still energized through the index switch 142 through the following circuit: lower contact 104 of motor control relay 100, lead 164, movable arm 150 of index switch 142, upper stationary contact 146 of index switch 142, lead 168, and power lead 110. The motor thus remains energized as long as the arm 144 of index switch 142 is atop one of the fluted portions of the index cam 86. When the arm 144 reaches a detent between flutes the circuit from movable arm 152 to upper stationary arm 146 is broken to break the power supply to the motor. Movable arm 150 immediately contacts lower stationary contact 148 to provide dynamic braking of the motor in the following manner. During the time that the motor is running, capacitor 94 charges through diode 96. When the arm 144 on index switch 142 reaches the bottom of the depression between the flutes on the index cam 86 and movable contact 150 engages stationary contact 148, the condenser 94 is connected across both the main and auxiliary windings 88 and 90 of the motor through the following circuit: lead 166, stationary contact 148, movable arm 150, lead 164, stationary contact 104 on motor control relay 100, movable arm 102, and lead 162. This immediately stops further movement of the motor so that the code shaft 34 is always accurately indexed to a discrete position corresponding to the frequency of the transmitted signal to which the wave signal receiver is tuned. It is thus seen that when the wave signal receiver is turned on, the code shaft 34 and code cam 84 rotate until the shaft and cam are brought into a position which corresponds to the particular transmitted frequency to which the wave signal receiver is tuned.

When the wave signal receiver is turned off, it is desirable to rotate the code shaft 34 and code cam 84 to a position indicative of this condition. The "off" switch 126 performs this function. It will be seen that when the wave signal receiver is turned off, the relay 112 is deenergized, breaking the previous power circuit which had been established through the motor control relay 100 to motor 80. However, the motor control relay remains energized through the following circuit: lower power supply line 110, conductor 160, movable arm 118 on relay 112, stationary contact 120, conductor 158, "off" switch 126, conductor 156, motor control relay 100, conductor 152, and upper power line 116. The motor thus continues to run until the arm 128 on "off" switch 126 drops into the depression 124 on the "off" cam 82. This establishes a position of the code cam 84 characteristic of the "off" condition in the wave signal receiver. When the arm 128 drops into the depression 124, the "off" switch 126 is opened, thereby breaking the power supply to the motor control relay 100. The motor is dynamically braked to a halt by the index switch 142 as previously described.

In the event that something goes wrong with the circuit so that the motor continues to rotate the code shaft 34, the heating element 172 in time delay tube 170 finally reaches such a temperature as to open contacts 180 and 182. The motor then continues to run until the arm 132 on "trouble" switch 130 drops into the detent 124. When this occurs the switch 130 is opened and the motor control relay 100 deenergized. This not only stops the motor from rotating but also provides a distinct position of the code shaft and code wheel to indicate that the unit is in need of maintenance or repair.

Practically all commercial wave signal receivers are tuned by the rotation of a knob or shaft. The present unit drives a second shaft and establishes a fixed relationship between the position of the second shaft and the tuner shaft or knob in the wave signal receiver. While the shaft or knob of the wave signal receiver may be rotated in either direction, the second shaft driven by this unit always rotates in the same direction to produce a series of D.C. pulses the number of which is proportional to the amount of rotation of the second shaft. The rotation of this second shaft is thus a function of the rotation of the tuner shaft in one direction and is a function of 360 minus the degrees of rotation of the tuner shaft in the other direction. The series of D.C. pulses produced are fed to suitable display or recording means in the central station 18 and this means may be of the type disclosed in the aforementioned copending application. The code cam 84 may be provided with a long reset lug 136 for resetting the indicating apparatus as the central station as pointed out in my copending application Serial No. 682,383, filed on an even date herewith.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A system for indicating at a remote point the tuning condition of a wave signal receiver having a local oscillator comprising, driving means, a shaft connected to the driving means, control means including a variable tuned circuit connected to receive a portion of the output of said local oscillator to establish one condition if the tuned circuit is responsive to the local oscillator frequency and another condition if not, means responsive to a condition of the control means to energize the driving means so that said shaft is rotated to positions determined by the frequency of the signal produced by said local oscillator and stopped, pulse producing means controlled by said shaft for producing a number of pulses which is a function of the rotation of said shaft, and means remote from said wave signal receiver controlled by said pulses to indicate the tuning condition of said wave signal receiver.

2. A system as set out in claim 1 including means fortuning the tuned circuit over the range of said local oscillator connected to said shaft so that rotation of said shaft changes the frequency to which said circuit is tuned.

3. A system as set out in claim 1 wherein an output voltage is developed by said tuned circuit when it is tuned to the frequency of said local oscillator.

4. A system as set out in claim 1 including cam switching means operable by the shaft to energize the driving means to return said shaft to the same position whenever said wave signal receiver is turned off.

5. The system as set out in claim 1 including means for confining rotation of said shaft to one direction.

6. A frequency responsive system for producing signals indicative of different input frequencies comprising in combination, variable frequency responsive means for developing an output condition in response to an input frequency to which it is tuned and another output condition for input frequencies to which it is not tuned, means controlled by the frequency responsive means for adjusting its tuning frequency in response to one of said conditions, and means under control of the adjusting means for producing a signal during the time of adjusting said tuning frequency indicative of the tuning frequency.

References Cited in the file of this patent

UNITED STATES PATENTS

| | | |
|---|---|---|
| 2,168,149 | Arnold | Aug. 1, 1939 |
| 2,320,996 | Alexanddersson | June 8, 1943 |
| 2,429,771 | Roberts | Oct. 28, 1947 |
| 2,474,527 | Heisner | June 28, 1949 |
| 2,623,936 | Kennedy | Dec. 30, 1952 |
| 2,676,084 | Bateman | Apr. 20, 1954 |